July 6, 1937.  J. L. BARR  2,086,459
AUTOMOBILE PARKING DEVICE
Original Filed Aug. 20, 1932  5 Sheets-Sheet 1

Inventor
JOHN L. BARR
By Semmes & Semmes
Attorneys

July 6, 1937. J. L. BARR 2,086,459
AUTOMOBILE PARKING DEVICE
Original Filed Aug. 20, 1932 5 Sheets-Sheet 3

Inventor
JOHN L. BARR
By Semmes & Semmes
Attorney

July 6, 1937.   J. L. BARR   2,086,459
AUTOMOBILE PARKING DEVICE
Original Filed Aug. 20, 1932   5 Sheets-Sheet 4

Inventor
JOHN L. BARR
By Semmes & Semmes
Attorneys

July 6, 1937. J. L. BARR 2,086,459
AUTOMOBILE PARKING DEVICE
Original Filed Aug. 20, 1932   5 Sheets-Sheet 5

Inventor
JOHN L BARR
By Semmes & Semmes
Attorneys

Patented July 6, 1937

2,086,459

UNITED STATES PATENT OFFICE 2,086,459

AUTOMOBILE PARKING DEVICE

John L. Barr, Chevy Chase, Md.

Application August 20, 1932, Serial No. 629,691
Renewed July 3, 1934

25 Claims. (Cl. 180—1)

This application is an improvement upon, and a continuation in part of my co-pending applications, identified as follows:

Serial No. 350,685, filed March 23, 1929 now Patent No. 1,967,219, dated July 24, 1934; Serial No. 357,254, filed April 22, 1929; Serial No. 363,172, filed May 15, 1929, now Patent No. 1,954,308, dated April 10, 1934; Serial No. 393,490, filed Sept. 18, 1929, now Patent No. 1,963,879, dated June 19, 1934; and Serial No. 480,511, filed Sept. 8, 1930, now Patent No. 1,969,198, dated Aug. 7, 1934.

An object of this invention is to minimize the danger of injury both to the elevating device and to the road bed through twisting strains which may be imposed upon the device due to inequalities in the road bed, cramp of the steering wheels and other like factors.

Another object of my invention is to provide a simple construction that is easily and cheaply made and will always be available for instant operation when it is necessary to turn the car on a short radius.

A still further object of my invention is to provide a device which will permit turning of the car on a short radius with a minimum of effort, and yet which has no harmful effect on the normal steering of the vehicle when the device itself is not in operation.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

Referring to the drawings, and particularly to the form of my device shown in Figures 1 to 6 inclusive, I have shown a steering axle of an automobile, which is normally the front axle, designated by the numeral 1. Mounted on this front axle are steering wheels 2, shown in a cramped position in dotted lines in Figure 2. In order to steer the wheels, proper connections such as are usual in constructions of this character are made, which include a steering tie rod 3.

Fastened by suitable U clamps 4 to the under side of the front axle is an elevating mechanism comprising a support plate 5, which acts as one-half of a swivel joint, the other half of which is a swivel plate 6 having an arm 7 integrally formed therewith. The support plate 5 and the swivel plate 6, which is in sliding contact therewith, are mounted so that the plate 6 can swivel on the plate 5. There is a stud 8, as plainly shown in Figure 4, whose upper end is provided with a head 9 which fits in the recess 11 of the support plate 5. The lower end of the stud 8 may be provided with a flanged portion 12 which is suitably attached by any known means to the stud 8, and which permits the swivel plate 6 to rotate on the support plate 5. The swivel plate 6 is provided with two downwardly extending trunnion blocks 13 which hold the ends of a stub axle 14.

Mounted to swing on the stub axle 14 is an elevating rod 15 which is screwed, at 16, into a bearing member 17 which swivels on the stub axle 14. At the lower end of the elevating rod 15 I have provided a foot construction comprising a foot member 18 into which is screwed the rod 15. A lock nut 19 is then screwed into position to hold the rod 15 in the foot member 18 at the desired position. This construction permits the rod 15 to have any desired operative length to accommodate for various sizes of cars.

Figures 4, 5, 6, 7:
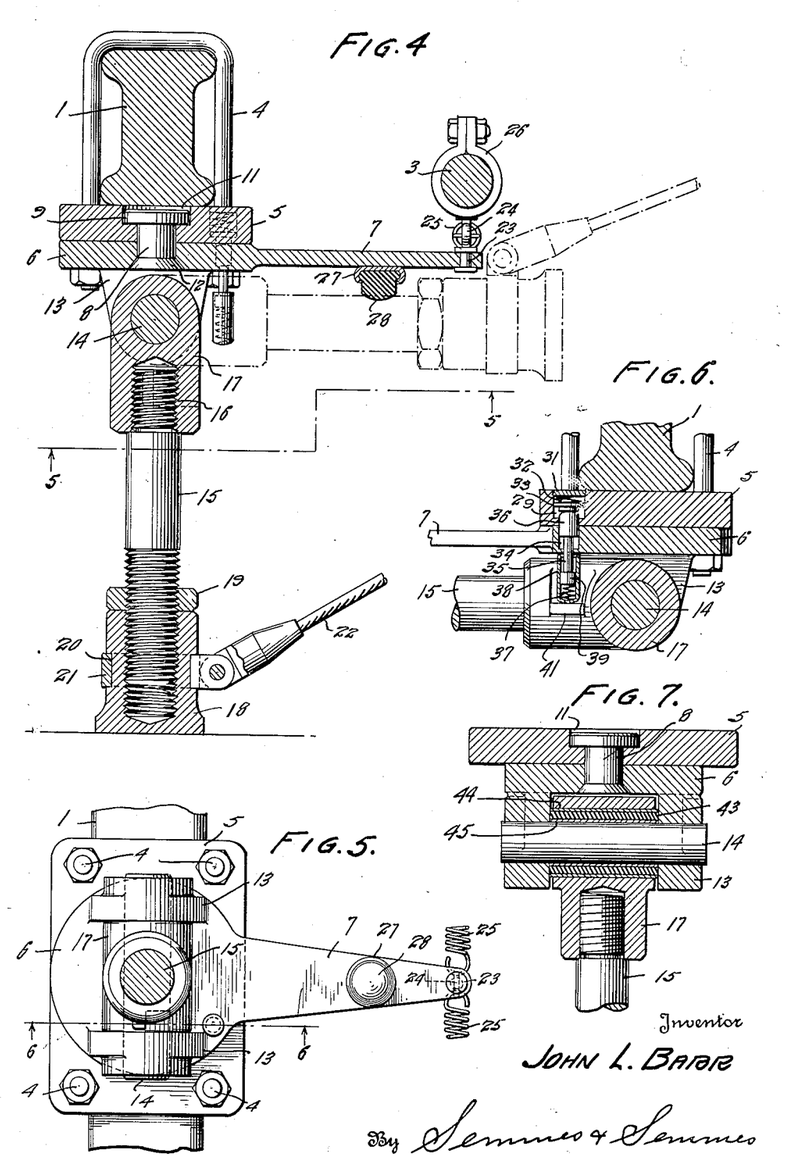
Fig. 4 is a view partly in cross section of the details of construction of my elevating device, showing in dotted lines the device raised to the inoperative position.
Fig. 5 is a view taken on the line 5—5 of Figure 4, looking in the direction of the arrows.
Fig. 6 is a view taken on the line 6—6 of Figure 5, looking in the direction of the arrows.
Fig. 7 is a cross sectional view of a modification of the joint between the elevating device and the car.

The foot member 18 is made with an annular recess 20 around which is bolted a collar 21 to which is attached, by suitable connections, a cable 22 so that upon pulling the cable the elevating rod 15 and the accompanying mechanism may be drawn up into the position shown in dotted lines in Figure 4.

The rod 15 may be, in operation, let down, and may swing on either side of the vertical. The driver, for instance in the position shown in Figure 3, drives the car forward to raise the front end sufficiently to relieve the weight on the front wheels to permit them to be readily turned. If the elevating rod 15, however, was on the other side of the vertical, he would back the car on to the rod so that the wheels could be readily turned. This general form of operation is shown in my other co-pending applications mentioned herein. It gives a flexibility of operation not inherent in the other devices. There is no danger of injuring the elevating rod because there is no stop against which the momentum of the car can deal a damaging impact.

The device is merely allowed to fall into engagement with the road bed, and if the driver fails to mount upon the device at the exact position he wants, and should drive over it, for instance by backing the car, he can come forward a few inches and mount it again. It will be understood that the control is applied through the power of the car and through the control of the foot brakes. It is an easy operation to drive up on the device and hold the car by means of the brakes in the desired position while the front wheels are turned. All this has been explained in my co-pending applications.

In the construction shown in the drawings, the arm 7 is provided near its end with a support piece 23 carrying an upstanding eyelet member 24 to which are attached springs 25, the springs 25 at their other ends being attached to support pieces 26 mounted on the steering tie rod 3.

The arrangement is such that through the arm 7 and the spring connections with the tie rod, the elevating rod 15 is swiveled on the swivel joint comprising the support plate 5 and swivel plate 6, so that when the rod 15 swings either forward or to the rear of the vertical on the stub axle 14, the plane of swing of the member 15 will be substantially in line with a plane passing through the wheels. This is plainly shown in Figure 2, which shows the wheels cramped and the rod 7 in dotted lines having been carried to one side. The plane of swing of the rod 15 will be substantially parallel to the cramped position of the wheels.

In order to permit the device to be held in its upper inoperative position, as shown in Figure 4, without danger of rattling or of injuring the device, or the car structure, I have shown on the bottom of the arm 7 a holding clamp 27 on which is mounted a rubber bumper 28 against which the rod 15 rests when the cable 22 has hauled it into its uppermost position.

In order to hold the mechanism in its inoperative position from swinging each time the steering wheels are moved, I have shown the support plate 5 provided with a recess 29 having a suitable cap 31 screwed therein. In the recess is mounted a spring 32 carrying a spring pressed plate 33. There is provided in the swivel plate 6 a recess 34 in which is mounted a plunger 35 having a head 36 which, in the position of the parts shown in Figure 6, passes through the apertures in the swivel plate 6 and support plate 5, locking the two so that the swivel plate 6 cannot rotate or swivel on the support plate 5. Urging the plunger 35 into its upper position is a spring 37 mounted in a support piece 38. The plunger 35 is provided at its lower end with a head 39 against which the spring 37 bears.

In the position shown in Figure 6, the head 36 of the plunger 35 locks the swivel plate 6 from rotation, and the plunger 35 is held in spring pressed relation between the tension springs 32 and 37. Upon lowering the elevating rod 15 by releasing the cable 22, a contact lug 41, which has been bearing against the head 39, falls with the rod 15 and no longer pushes against the head 39. The head 39 then falls and the spring 32 pushes the head 36 of the plunger 35 to the lower position so that the head 36 no longer locks the swivel plate 6 from rotation.

Figure 1:
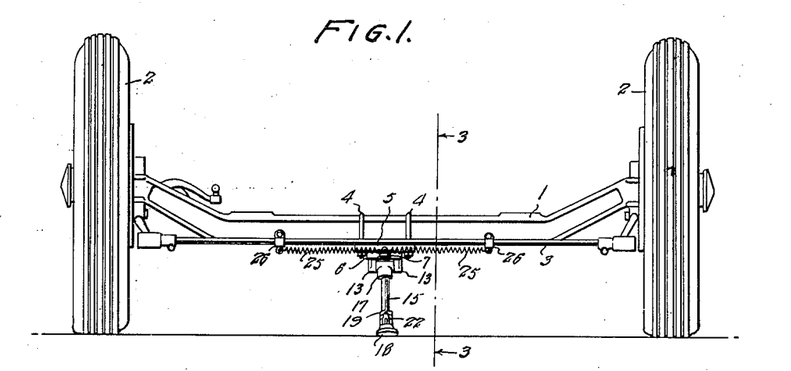
Figure 1 is an elevation, looking from the rear of the car towards the front, of the front steering wheels of the car with my elevating device attached in place.
Figure 2:
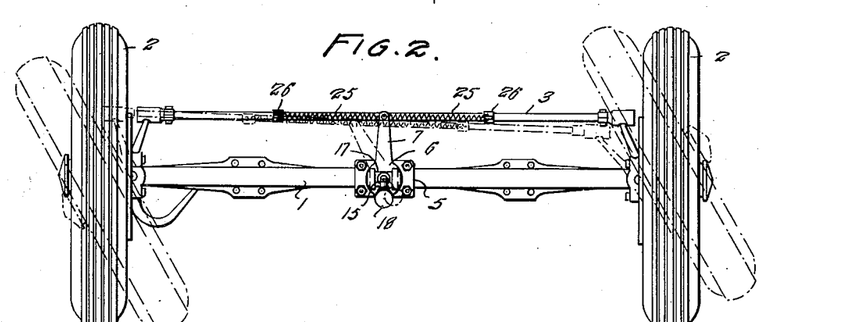
Fig. 2 is a bottom plan view of the construction shown in Figure 1, with part of the details omitted.

Now, let us assume that the rod 15 has again been raised into the position shown in Figure 6, but that the cramp of the wheels prevents the head 36 from entering in the aperture in the plate 5. In such a case no harm is done because the spring 37 is merely compressed and the head 36 will enter the aperture in the plate 5 when the rod 7 is in a position such as is shown in Figure 2 in the full line position.

This construction permits the device to be held in position to prevent its constant swivelling when not in use, and yet it is free to swivel immediately upon lowering the elevating rod 15. By reason of the fact that the connection between the rod 7 and the tie rod 3 is through springs 25, the normal steering of the vehicle when the parts are in the position shown in Figure 6 can proceed without undue interference. The spring connection between the rod 7 and the rod 3 is also of advantage in view of changes in the angular position of the rod 3 during cramping of the wheels—for instance such an advantage as is depicted in dotted lines in Figure 2.

In Figure 7 I have shown a modification in which the bearing member 17 is shown mounted in the shaft 14 through a rubber or elastic bushing member 42, comprising a rubber ring 43 and bushings 44 and 45. This construction permits rocking of the elevating rod 15 on the shaft 14 to take care of some of the strains imposed while moving the car either into forward or back position while the wheels are cramped. Means, of course, have been shown in the other forms of device for swivelling the rod 15 so that its plane of rotation on the stub axle 14 coincides substantially with the cramp of the steering wheels. Since there is a slight arcuate motion to the front of the car when the device is used while the steering wheels are cramped, under some conditions of operation I prefer to permit a slight rocking of the elevating rod 15 on the stub axle 14, and the form shown in Figure 7 will take care of this limited motion just described. Under certain conditions of operation it is not necessary to employ the form of device shown in Figure 7, but it has certain inherent advantages.

Figures 3, 8, 9:
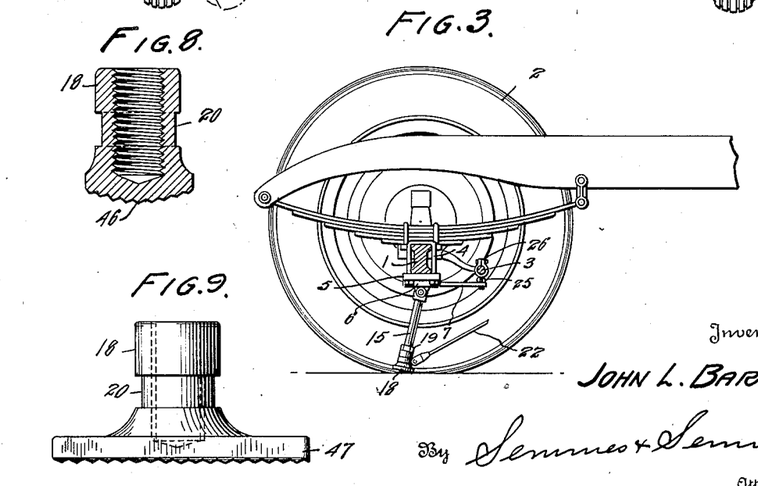
Fig. 3 is a view taken on the line 3—3 of Figure 1, looking in the direction of the arrows.
Fig. 8 is a detail in cross section of a modified form of ground engaging member for the elevating device.
Fig. 9 is a front elevation of a modified form of ground engaging device for the elevating member.

In Figure 8 I have shown a modification of the foot member 18 wherein the ground engaging portion is rounded and provided with serrations 46 which may be of any desired configuration.

In Figure 9 is shown a still further modification in which the ground engaging extremity of the foot member 18 presents an enlarged flat surface, as shown at 47, and is provided with a serrated or roughened surface.

Figure 10:
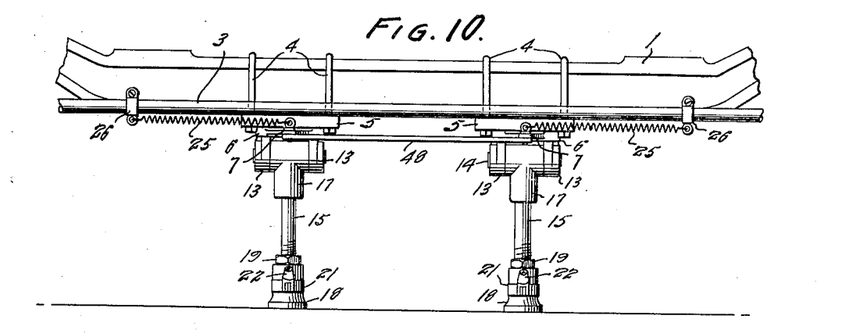
Fig. 10 is a rear elevation of another form of elevating device.

In the form of device shown in Figure 10, I have provided two elevating members similar in construction to those already described. These elevating members are linked by a link piece 48, which links the two rods together. Separate cables are fastened to the foot pieces of the rods 15. These cables may be joined and controlled through a single cable or not, as desired. The members 15, by reason of the link piece 48, must swivel together, but are capable each of separate swinging movement on their respective stub axles.

Figure 11:
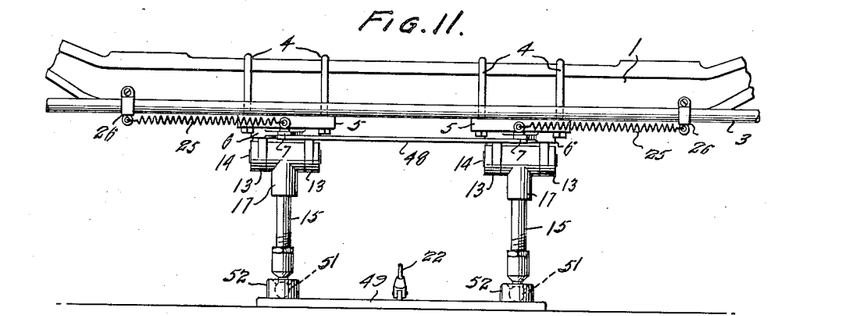
Fig. 11 is a rear elevation of another modification.

In the form shown in Figure 11, the construction is similar to that shown in Figure 10, with the exception that there is provided an elongated ground engaging member 49, and the elevating rods 15 are provided at their extremities with balls 51 which fit into socket members 52 carried by the elongated ground engaging member 49. In this form, but one cable 22 is used to raise the members to an inoperative position. Their swivelling movement is provided at the bottom of the elevating rods 15 through the ball and socket connection with the member 49.

Figure 12:
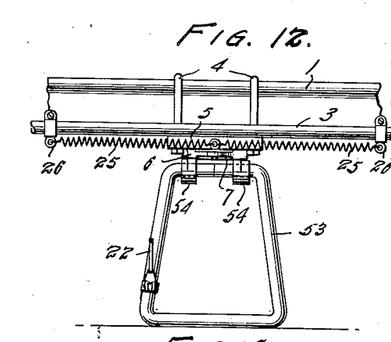
Fig. 12 is a rear elevation of another modification.

Figure 12 shows a construction similar to that shown in Figures 1 to 6 inclusive, except that the elevating rod 15 has been replaced by a bar of trapezoidal construction 53, which is adapted to swing in trunnions 54 mounted on the swivel plate 6. The cable 22 may be attached in any suitable place, as at one side of one of the non-parallel sides of the trapezoid 53.

Figure 13:
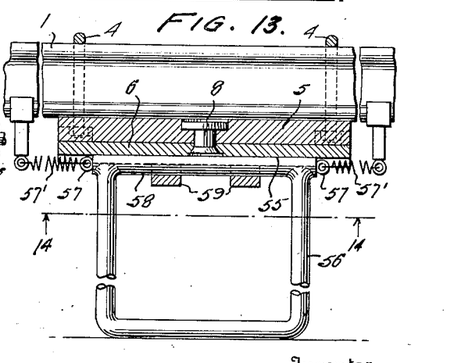
Fig. 13 is a front elevation partly in cross section of another modification.
Figure 14:
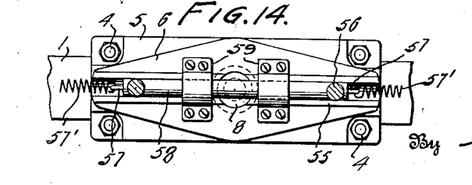
Fig. 14 is a view taken on the line 14—14 of Figure 13, looking in the direction of the arrows.

In Figures 13 and 14 I have shown a form of device in which the base plate 5 and swivel plate 6 are of considerably greater length than for instance in the forms shown in Figures 1 to 6 inclusive. The swivel plate is not provided with any arm, but is provided with a downwardly projecting trough 55 in which is adapted to slide the top of a rectangular elevating leg construction 56. Eyelet members 57 are positioned at either end of the top of the elevating leg construction 56, and spring members 57' tend to center this construction in the position shown in Figure 13. Passing around the top bar of the elevating construction 56, which I have designated by the numeral 58, are straps 59 which permit the bar to rotate, and at the same time to slide in the trough construction 55.

In the construction shown in Figures 13 and 14, the elevating construction is free to swivel about the member 8. The member 56 can be raised and lowered, pivoting on the straps 59, and a sliding motion is possible in the trough 55. Thus freedom of motion in a plurality of directions is possible to prevent strain on the elevating device and its cooperating structure, as well as on the road bed.

Figure 15:
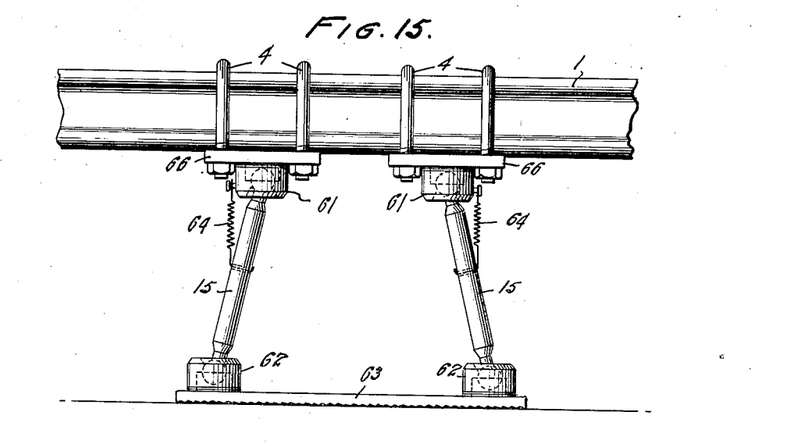
Fig. 15 is a front elevation of another modification.
Figure 16:
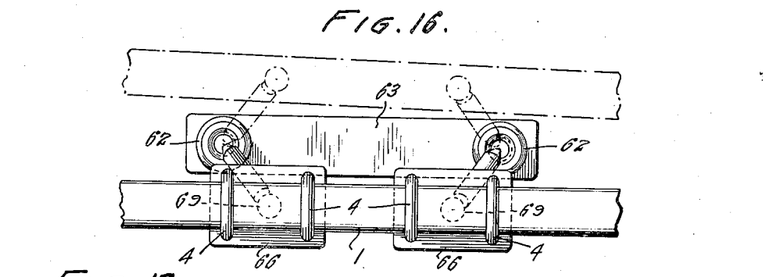
Fig. 16 is a top plan view of the modification shown in Fig. 15, showing the position of the parts with respect to the ground engaging member when the car is run up on the device with the wheels cramped.
Figure 17:
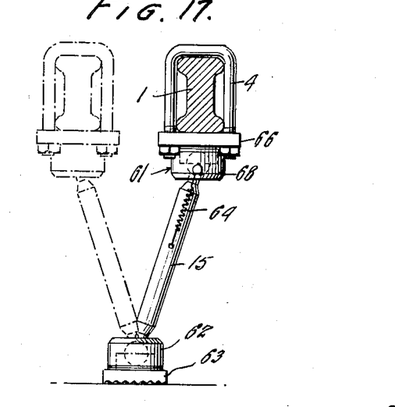
Fig. 17 is a detail side elevation of the modification shown in Figure 15, showing the ground engaging member in front of the vertical and in dotted lines in back of the vertical.
Figure 18:
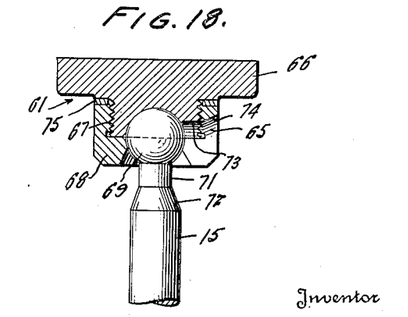
Fig. 18 is a detail of the ball and socket joint at the upper end of one of the elevating members of the form disclosed in Figure 15.

In Figures 15 to 18 inclusive I have shown a construction in which the elevating legs 15 are mounted to have universal movement at their top as well as at their bottom. Referring to Figure 15, I have shown socket arrangements 61 attached to the front axle of an automobile. The elevating legs 15 have a ball arrangement which fits into these sockets. The bottom of the elevating legs 15 have ball constructions which fit into socket members 62 which are mounted on a base plate 63. The device may be raised and lowered by a cable, not shown. The position of the parts in moving from one side of the vertical to the other side of the vertical position of the elevating legs 15 while the wheels are cramped is illustrated in Figure 16, which shows the free action of the elevating legs in the universal joints at both the top and at the bottom of the legs. As shown in Figure 15, the elevating legs 15 are off the vertical and this tends to give stability to the ensemble in a direction lateral to the longitudinal axis of the car when the device is in operation. The inward slant of the legs 15 towards each other thus performs a useful function. Of course an outward slant to the legs would accomplish a similar purpose.

Springs 64 are attached to the legs 15, and to the socket members 61 at a point below the point of pivoting of the legs 15 in the socket members. The construction of the upper socket members is apparent from an inspection of Figure 18, which shows that one side of the socket members, located at the top of the legs 15, is cut out, as indicated at 65, to permit the legs to be raised to the inoperative position.

The socket arrangement at the top comprises a base plate 66 provided with screw threads 67 and a retaining ring 68 screw-threaded over the base plate 66, holding the ball 69 in the upper end of the members 15 in place. The members 15 can be raised into the inoperative position, and at that time the surfaces 71 and 72 will contact with the surfaces 73 and 74, respectively, in the base plate and retaining ring. A shim construction 75 is provided between the retaining ring 68 and the base plate 66 to permit proper adjustment to hold the ball 69 in position without undue friction.

Another type of device is shown in Figures 19 to 23, inclusive. In this construction there is a base plate 76 held on the front axle by suitable straps 77. The base plate 76 is provided with downwardly projecting split trunnion blocks 78 which are held together by screws 79, and in which are mounted trunnions 81. The trunnions support a socket arrangement 82 with a removable cap 83, flattened at its upper surface. Mounted in the socket arrangement 82 is a ball 84 which is mounted on a rod 85, adapted to be screw-threaded into the elevating leg 15 at the top. The rod 85 is inserted in the aperture of the socket member and the cap 83 screwed thereon to hold the ball in place, thus giving a firm ball and socket arrangement. There is a conical aperture 86 in the bottom of the socket member 83 permitting limited universal movement between the ball and socket, allowing the leg 15 to swing with a universal action. The ground engaging construction is similar to that shown in Figure 1.

Surrounding the socket member 82 is a guiding spring 87, the other end of which surrounds and engages the elevating leg 15. This spring tends at all times to retain the elevating leg in its vertical position while the parts are in the position shown in Figure 19, and will tend to keep the leg 15, when the socket 82 is moved, in the same relation to the socket as is depicted in the views, Figures 19 and 20.

Figures 19, 20, 21, 22, 23:
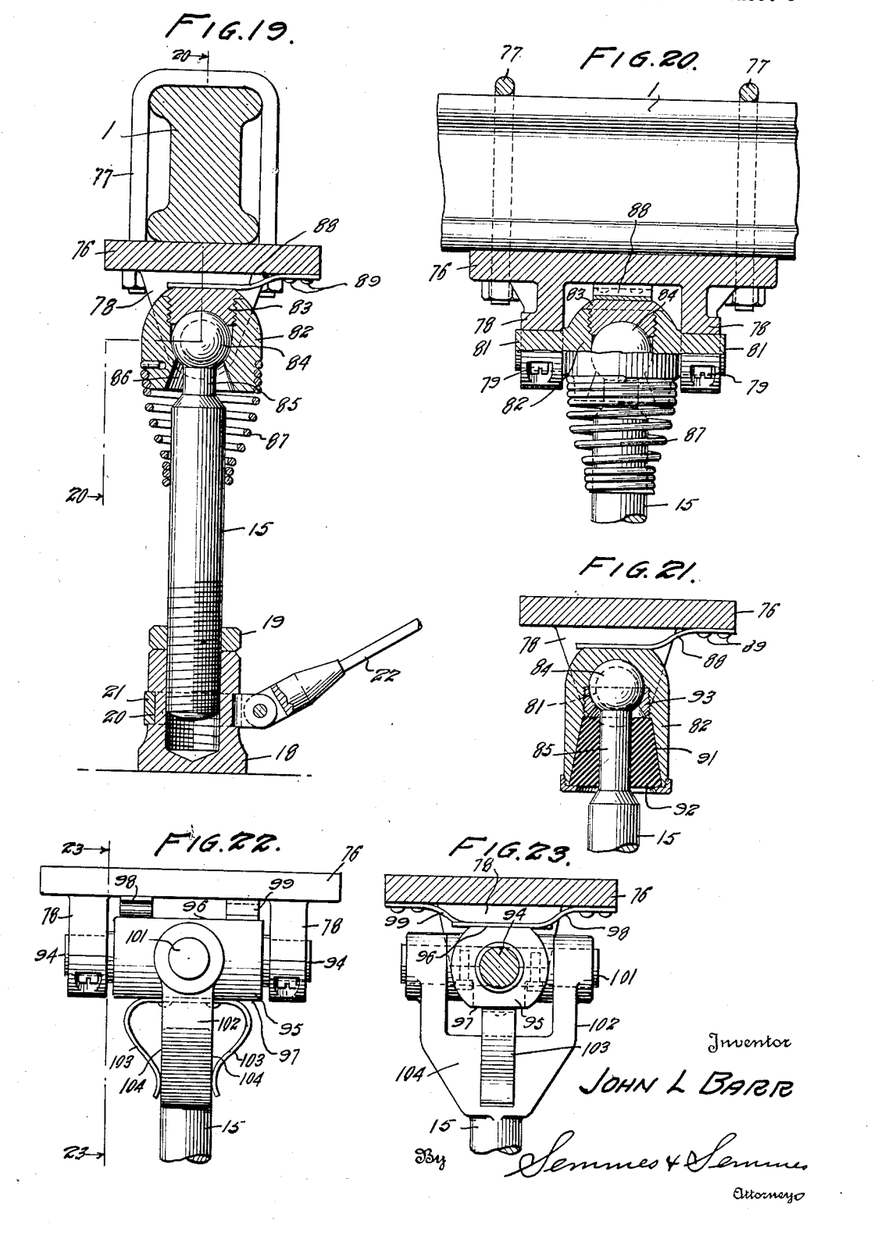
Fig. 19 is a side elevation partly in cross section of another modification of my device.
Fig. 20 is a view taken on the line 20—20 of Figure 19, looking in the direction of the arrows.
Fig. 21 is a detail partly in cross section of a modification of a mounting for the type of device disclosed in Figure 19.
Fig. 22 is a detail view of a modification showing the attachment of the elevating member to an automobile.
Fig. 23 is a view taken along the line 23—23 of Figure 22, looking in the direction of the arrows.

In the position shown in Figure 19, a spring member 88 bears against the flattened upper surface of the cap 83. The spring member 88 is attached at 89 to the base 76. By reason of the fact that this spring member 88 exerts a downward force and tends to lie flat against the flattened upper surface of the cap 83, the socket member 82 is urged to maintain the position shown in Figure 19. In this position the spring 87 tends to hold the elevating leg 15 in the perpendicular position. By pulling on cable 22 the elevating leg can be raised from the operative into the inoperative position.

When the leg is in the downward position, in moving the car either forward or backward, depending upon the position of the ground engaging or foot member 18, the front wheels are elevated by the elevating leg 15. By reason of the fact that in normal operation not all of the weight is taken off of the steering wheels, the frictional engagement of the steering wheels with the ground will prevent collapse of the elevating leg in a direction transverse to the longitudinal axis of the car, which would normally occur were all of the weight taken off the front wheels.

In Figure 21 is shown a form of the device in which the socket member 82 is provided with a deep recess 91 in which is mounted an elastic member, such as rubber, 92, which surrounds the rod 85 and tends to hold it in the vertical position, thus holding the elevating leg 15 in that position. The structure in this case is somewhat different from that shown in Figures 19 and 20. There is no removable cap in the form shown in Figure 21, but there is an annular holding ring 93 which holds the plate 84 in its position in the socket member 82.

In Figures 22 and 23, instead of using a ball and socket arrangement I have shown the trunnion block 78 supporting a trunnion 94 of somewhat greater length than the trunnion 81 of the form shown in Figures 19 and 20. Mounted on the trunnion 94 is an elongated cylindrical spider 95, having a flattened top 96 and a flattened bottom 97. Two springs 98 and 99 bear against the flattened top 96 and tend to hold the member 95 in the position shown in Figures 22 and 23.

The member 95 is provided with stub shafts 101 on which is journaled a yoke piece 102, which may be integrally formed with the elevating leg 15. Springs 103 press against either side of flattened surfaces 104 of the yoke piece 102, and tend to hold the elevating leg 15 in the position shown in Figure 22.

The operation of this construction is similar to that described in connection with Figures 19 and 20, as well as Figure 21. The springs 98 and 99 and the springs 103 tend to hold the elevating leg 15 in the position shown in the drawings. By reason of the frictional engagement of the front wheels, when cramped, with the road, even in their so called elevated position, collapse of the elevating leg 15 in a direction transverse to the longitudinal axis of the car will not normally occur, and the device may be used to elevate the wheels by driving either to the front or to the back, depending upon the position of the ground engaging portion of the elevating leg.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A device to relieve at least part of the weight on the steering wheels of a vehicle, comprising elevating means adapted to swing on both sides of the vertical to raise the vehicle by forward or backward movement of the vehicle, depending upon which side of the vertical the elevating means is in engagement with the road bed, and means cooperating with the steering mechanism for the steering wheels tending to line up the plane of swing of the elevating means with the direction of cramp of the steering wheels.

2. In the combination of a device for elevating that part of a vehicle to which the steering wheels are attached, a steering tie rod, elevating means adapted to swing on both sides of the vertical to raise the vehicle by forward or backward movement of the vehicle, depending on which side of the vertical the elevating means is in engagement with the road bed, and connecting means attached to the steering tie rod and the elevating means tending to line up the plane of swing of the elevating means with the direction of cramp of the steering wheels.

3. A device to relieve at least part of the weight on the steering wheels of a vehicle comprising elevating means adapted to swing on both sides of the vertical to raise the vehicle by forward or backward movement of the vehicle, depending on which side of the vertical the elevating means is in engagement with the road bed, a swivel joint between the elevating means and the vehicle, means attached to the steering mechanism for the steering wheels operating to swivel the elevating means on the swivel joint, thus tending to line up the plane of swing of the elevating means to approximately parallel the planes of the steering wheels when they are cramped.

4. A device to relieve at least part of the weight on the steering wheels of a vehicle, comprising elevating means adapted to swing on both sides of the vertical to raise the vehicle by forward or backward movement of the vehicle, depending on which side of the vertical the elevating means is in engagement with the road bed, a swivel joint between the elevating means and the vehicle, an arm on that part of the swivel joint which is rigidly connected with the elevating means, and means attached to the steering mechanism and to said arm to swivel the elevating means to line up the plane of swing of the elevating means with the direction of cramp of the steering wheels.

5. In the combination of a device for elevating that part of a vehicle to which the steering wheels are attached, a steering tie rod, elevating means adapted to swing on both sides of the vertical to raise the vehicle by forward or backward movement of the vehicle, depending on which side of the vertical the elevating means is in engagement with the road bed, a swivel joint between the elevating means and the vehicle, means attached to the steering tie rod and operating on the swivel joint to swivel the elevating means to line up the plane of swing of the elevating means to approximately parallel the planes of the steering wheels when they are cramped.

6. In the combination of a device for elevating that part of a vehicle to which the steering wheels are attached, a steering tie rod, elevating means, a swivel joint between the elevating means and the vehicle, an arm on that part of the swivel joint which is rigidly connected with the elevating means, and means connecting the steering tie rod and said arm to swivel the elevating means to line up its plane of swing with the direction of cramp of the steering wheels.

7. In the combination of a device for elevating that part of a vehicle to which the steering wheels are attached, a steering tie rod, elevating means, a swivel joint between the elevating means and the vehicle, an arm on that part of the swivel joint which is rigidly connected with the elevating means, and spring connecting means between the tie rod and the arm to swivel the elevating means so that its plane of swing is approximately parallel to the steering wheels when they are cramped.

8. A device to relieve at least part of the weight on the steering wheels of a vehicle comprising, elevating means adapted to swing on both sides of the vertical to raise the vehicle by forward or backward movement of the vehicle, depending on which side of the vertical the elevating means is in engagement with the road bed, a joint on which the elevating means swings, a swivel joint between the first named joint and the vehicle to permit the elevating means to swing in the plane of cramp of the steering wheels, and means to permit the elevating means to rock on the first named joint.

9. A device for elevating that part of a vehicle to which the steering wheels are attached to relieve at least part of the weight thereon, comprising a plurality of operatively connected elevating members adapted to swing on both sides of the vertical to elevate the vehicle by forward or backward movement of the vehicle, depending on which side of the vertical the elevating members are in contact with the road bed, and universal joints between the members and the vehicle.

10. A device for elevating that part of a vehicle to which the steering wheels are attached to relieve at least part of the weight thereon, comprising a plurality of operatively connected elevating members adapted to swing on both sides of the vertical to elevate the vehicle by forward or backward movement of the vehicle, depending on which side of the vertical the elevating members are in contact with the road bed, universal joints between the members and the vehicle, a foot piece, and universal joints between the foot piece and the elevating members.

11. A device for elevating that part of a vehicle to which the steering wheels are attached to relieve at least part of the weight thereon, comprising a plurality of operatively connected elevating members adapted to swing on both sides of the vertical to elevate the vehicle by forward or backward movement of the vehicle, depending on which side of the vertical the elevating members are in contact with the road bed, universal joints between the members and the vehicle, a foot piece, universal joints between the foot piece and the elevating members, and spring means tending to hold the elevating members in normal operative position.

12. A device to relieve at least part of the weight on the steering wheels of a vehicle, comprising means to raise the axle carrying the steering wheels on backward or forward movement of the vehicle, and means cooperating with the steering mechanism to align the elevating means with the steering wheels.

13. A device to relieve at least part of the weight on the steering wheels of a vehicle, comprising means to elevate the end of the vehicle carrying the steering wheels by backward or forward movement of the vehicle, and means to align the elevating means with the steering wheels.

14. A device to relieve at least part of the weight on the steering wheels of a vehicle, comprising means to elevate the end of the vehicle carrying the steering wheels by backward or forward movement of the vehicle, said elevating means being normally adapted to swing on an axis across the longitudinal axis of the vehicle but being pivoted so that the forces exerted thereon may act in alignment with the steering wheels if the steering wheels are turned so as to be out of alignment with the longitudinal axis of the vehicle.

15. A device to relieve at least part of the weight on the steering wheels of a vehicle comprising a compression element on which the vehicle is adapted to be driven free to move to compensate for sideways and twisting strains throughout the entire weight relieving operation, and means for supporting the element on the vehicle to compensate for shearing forces, including two pivots for the compression element whose axes are angularly displaced.

16. A device to relieve at least part of the weight on the steering wheels of a vehicle comprising a compression element on which the vehicle is adapted to be driven, free to move to compensate for sideways and twisting strains throughout the entire weight relieving operation, and means for supporting the element on the vehicle permitting movement in two planes including two pivots for the compression element whose axes are substantially at right angles to each other.

17. A device to relieve at least part of the weight on the steering wheels of a vehicle comprising a compression element on which the vehicle is adapted to be driven, free to move to compensate for sideways and twisting strains throughout the entire weight relieving operation, and a support for said element on the vehicle permitting pivoting in two planes, said support being free to move in the two planes throughout the entire weight relieving operation, and including two pivots having their axes substantially at right angles.

18. A device to relieve at least part of the weight on at least one of the steering wheels of a vehicle comprising a compression element on which the vehicle is adapted to be driven by forward and backward movement of the vehicle, said compression element being free to move to compensate for sideways and twisting strains throughout the entire weight relieving operation, and means for pivoting the compression element on the vehicle for movement in two planes, said means permitting free movement in the two planes throughout the entire weight relieving operation and including two pivots whose axes are angularly displaced.

19. A device to relieve at least part of the weight on at least one of the steering wheels of a vehicle comprising a compression element on which the vehicle is adapted to be driven by forward and backward movement of the vehicle, said compression element being free to move to compensate for sideways and twisting strains throughout the entire weight relieving operation, and means for pivoting the compression element on the vehicle for pivoting in two planes at right angles to each other, said means permitting free pivoting in the two planes throughout the entire weight relieving operation, and including two pivots whose axes are substantially at right angles to each other.

20. A device to relieve at least part of the weight on the steering wheels of a vehicle comprising a compression element on which the vehicle is adapted to be driven, said element being free to move to compensate for shearing and twisting strains throughout the entire weight relieving operation, and a universal joint by which the compression element is supported on the vehicle.

21. A device for elevating that part of a vehicle to which the steering wheels are attached to relieve at least part of the weight thereon, comprising elevating means adapted to swing on both sides of the vertical to elevate the vehicle by forward or backward movement of the vehicle, depending upon which side of the vertical the elevating means is in contact with the roadbed, a foot on the means mounted for universal movement, and means for laterally centering the elevating means.

22. A device for elevating that part of a vehicle to which the steering wheels are attached to relieve at least part of the weight thereon, comprising elevating means, a universal mounting for the elevating means between the elevating means and the vehicle, a foot, a universal mounting between the foot and the elevating means, and means for laterally centering the elevating means.

23. A device for elevating that part of a vehicle to which the steering wheels are attached to relieve at least part of the weight thereon, comprising elevating means adapted to swing on both sides of the vehicle to elevate the vehicle by forward or backward movement of the vehicle, depending upon which side of the vertical the elevating means is in contact with the roadbed, a universal mounting for the elevating means between the elevating means and the vehicle, a foot, and a universal mounting between the foot and the elevating means.

24. A device for elevating that part of a vehicle to which the steering wheels are attached to relieve at least part of the weight thereon, comprising elevating means adapted to swing on both sides of the vehicle to elevate the vehicle by forward or backward movement of the vehicle, depending upon which side of the vertical the elevating means is in contact with the roadbed, a universal mounting for the elevating means between the elevating means and the vehicle, a foot, and a ball and socket joint between the foot and the elevating means.

25. A device for elevating that part of a vehicle to which the steering wheels are attached to relieve at least part of the weight thereon, comprising elevating means adapted to swing on both sides of the vehicle to elevate the vehicle by forward or backward movement of the vehicle, depending upon which side of the vertical the elevating means is in contact with the roadbed, a universal mounting for the elevating means between the elevating means and the vehicle, a foot, a ball and socket joint between the foot and the elevating means, and means for laterally centering the elevating means.

JOHN L. BARR.